United States Patent
Shaw et al.

(10) Patent No.: US 8,491,680 B2
(45) Date of Patent: Jul. 23, 2013

(54) GASIFICATION PROCESS

(75) Inventors: William A. Shaw, Milwaukee, WI (US); Stanton R. Smith, Cambridge, MA (US)

(73) Assignee: Veolia Water Solutions & Technologies North America, Inc., Moon Township, PA (US)

( * ) Notice: Subject to any disclaimer, the term of this patent is extended or adjusted under 35 U.S.C. 154(b) by 601 days.

(21) Appl. No.: 12/786,737

(22) Filed: May 25, 2010

(65) Prior Publication Data

US 2011/0289847 A1 Dec. 1, 2011

(51) Int. Cl.
- *C01B 3/36* (2006.01)
- *C01B 6/24* (2006.01)
- *B01J 7/00* (2006.01)
- *B01D 63/00* (2006.01)

(52) U.S. Cl.
USPC .......... 48/197 R; 48/210; 423/644; 210/321.6

(58) Field of Classification Search
USPC ................ 48/61, 197 R; 210/321.6
See application file for complete search history.

(56) References Cited

U.S. PATENT DOCUMENTS

| | | | |
|---|---|---|---|
| 6,086,722 | A | 7/2000 | Webster, Jr. et al. |
| 2009/0188867 | A1 | 7/2009 | Vuong et al. |
| 2009/0236213 | A1 | 9/2009 | Yang et al. |
| 2010/0172819 | A1 * | 7/2010 | Wallace et al. ............ 423/471 |

OTHER PUBLICATIONS

International Search Report mailed Aug. 26, 2011 in re International Application No. PCT/US11/37666 filed May 24, 2011.

* cited by examiner

*Primary Examiner* — Matthew Merkling
(74) *Attorney, Agent, or Firm* — Coats and Bennett, P.L.L.C.

(57) ABSTRACT

A gasifier waste stream from a gasification process is directed to a solids separator. A portion of the suspended solids in the waste stream is removed in the solids separator, producing slag and fly ash and a grey water effluent. The grey water effluent is directed to one or more ceramic membranes which remove at least portions of the remaining suspended solids in the grey water. Permeate from the ceramic membrane is directed to an evaporator located downstream from the ceramic membrane for further concentration. Placing the ceramic membrane upstream from the evaporator reduces fouling and plugging in the evaporator that would otherwise occur due to the suspended solids in the grey water.

28 Claims, 3 Drawing Sheets

GASIFICATION PROCESS

FIELD OF INVENTION

The present invention relates to a carbonaceous gasification process, and more particularly relates to treating a waste stream produced in a carbonaceous gasification process.

BACKGROUND

Gasification processes, such as integrated gasification combined cycle (IGCC), used to convert coal and/or petroleum coke to a synthesis gas (syngas), produce a gasifier waste stream containing pollutants. The gasifier waste stream, often referred to as black water, contains high levels of suspended solids, such as slag and fly ash. Thus, the gasifier waste stream must be treated before it can be discharged or reused. A portion of the suspended solids in the gasifier waste stream may be removed in a solids separator or clarification process. This separation process generally requires a large quantity of polymers and flocculants to help promote settling of the suspended solids. After settling at least some of the suspended solids in the gasifier waste stream, the resulting grey water, is directed to one or more evaporators to recover relatively clean water and solids for disposal.

Upsets in the operation of black water solids separators, however, are very common. During these upsets, the gasifier waste stream overflows the solids separator and is directed to the downstream evaporator(s). The high levels of suspended solids in the gasifier waste stream cause fouling in various elements of the evaporator(s). Accordingly, the evaporator(s) need to be taken-off line and mechanically cleaned to remove accumulated slag deposits. This results in delays in treating the gasifier waste stream, which is costly and inconvenient.

SUMMARY OF THE INVENTION

According to one aspect of the present invention, a gasifier waste stream is directed through a ceramic membrane prior to being treated in a downstream evaporator. Treatment with the ceramic membrane removes a significant amount of the suspended solids in the gasifier waste stream and thus, reduces fouling in the evaporator.

In another embodiment, a gasifier waste stream from a gasification process is directed to a solids separator. A portion of the suspended solids in the waste stream is removed in the solids separator, producing slag and fly ash and grey water effluent. The grey water effluent is directed to a ceramic membrane to remove at least a portion of the remaining suspended solids in the grey water. Permeate from the ceramic membrane is directed to an evaporator disposed downstream from the ceramic membrane for further concentration. Placing the ceramic membrane upstream from the evaporator reduces fouling and plugging in the evaporator that would otherwise occur due to the suspended solids in the grey water.

Other objects and advantages of the present invention will become apparent and obvious from a study of the following description and the accompanying drawings which are merely illustrative of such invention.

DESCRIPTION OF EXEMPLARY EMBODIMENTS

Figure 1:
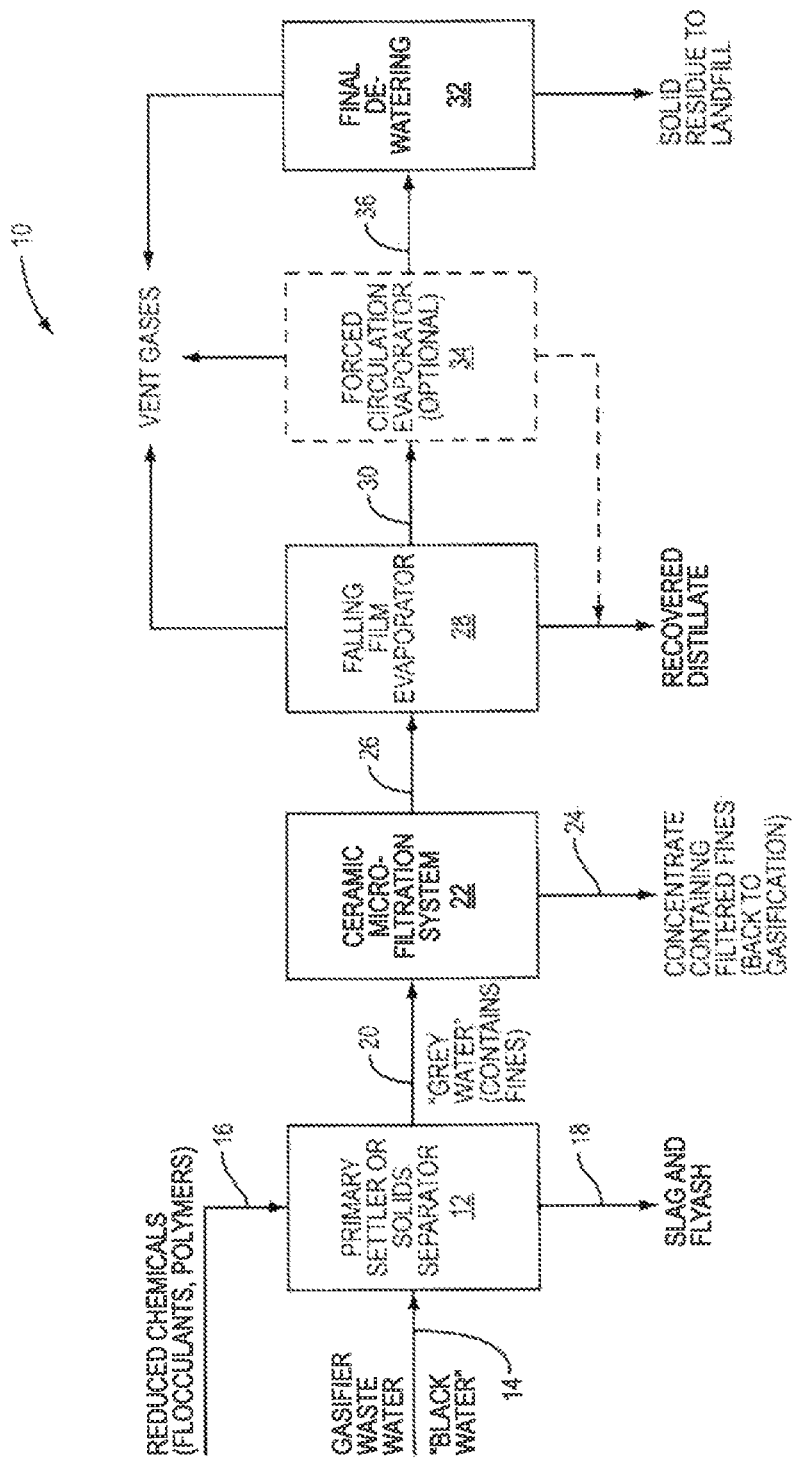
FIG. 1 is a schematic illustration of a side stream process for treating a gasification waste stream utilizing a ceramic membrane upstream of an evaporator.

A system for treating a gasifier waste stream is generally indicated by the numeral 10 in FIG. 1. In the embodiment illustrated therein, the method for treating a gasifier waste stream may be used to treat a waste stream from any gasification process that produces syngas. Viewing waste stream treatment system 10 in more detail, the gasifier waste stream, or black water, from a gasification process is directed into one or more solids separators 12 through waste stream inlet 14. The majority of the total suspended solids, including slag and fly ash, in the gasifier waste stream are settled in the solids separator 12. The solids separator 12 can be any type of conventional solids separator including, for example, a clarifier, centrifuge, hydrocyclone, drum filter, screw press, or candle filter. The gasifier waste stream may also be chemically pretreated prior to entering the solids separator 12 or in the solids separator 12. Generally, chemical pretreatment either adjusts the pH of the gasifier waste stream or precipitates solids in the gasifier waste stream. For example, lime and sulfides may also be added to the gasifier waste stream in the solids separator 12 to precipitate heavy metals. In the embodiment shown in FIG. 1, coagulants and flocculants are added to the solids separator 12 through inlet 16 to help promote settling of solids in the gasifier waste stream. The settled suspended solids are removed as slag and fly ash from solids separator 12 through outlet 18. The resulting water is often referred to as grey water and exits solids separator 12 through outlet 20. Grey water typically contains significantly less suspended solids than black water. However, grey water, as the name suggests, does contain some fine suspended solids. The concentration of the grey water exiting the solids separator 12 varies greatly, particularly during upsets in the solids separator. Grey water can have a concentration of total suspended solids between 50 ppm to 100,000 ppm.

Figure 3:
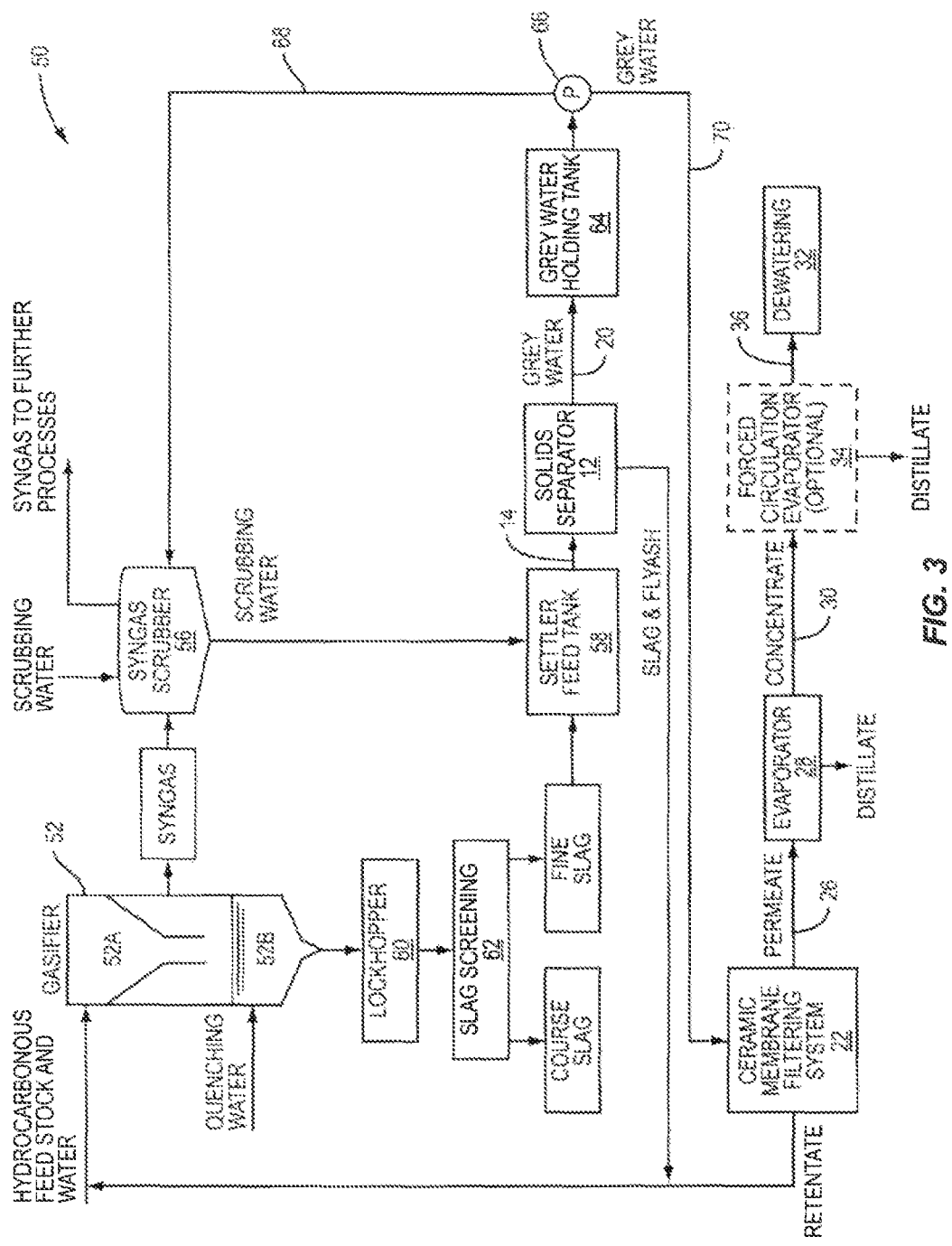
FIG. 3 is a schematic illustration showing the gasification waste stream process shown in FIG. 1 applied to a gasification process.

In a typical gasification process, the grey water exiting the solids separator 12 is split into two separate streams. A relatively large stream of the grey water is recirculated to the gasification process, while a relatively small stream is treated in a sidestream process. Although not shown in FIG. 1, the grey water may be directed from the solids separator 12 to a holding tank prior to being split into two separate streams. FIG. 3 shows an example of this process. In the embodiment shown in FIG. 1, the grey water treated in the sidestream process is directed from the solids separator 12 to a ceramic membrane 22. The ceramic membrane 22 removes a majority of the remaining suspended solids in the grey water and produces a retentate (containing removed solids) and a permeate. Ceramic membrane 22 may be an ultrafiltration or a microfiltration membrane, depending on the particle size distribution of the suspended solids and other characteristics of the grey water.

In a typical process, the ceramic membrane 22 will remove 95% or more of the suspended solids from the grey water sidestream. More particularly, the fine slag and fly ash will be removed by the ceramic membrane 22, thereby substantially reducing the fouling potential with respect to a downstream evaporator 28. The retentate from the ceramic membrane 22 exits the ceramic membrane 22 through outlet 24. A portion of the retentate, which is generally less than 5% of the grey water volume in the sidestream, may be recirculated back to the solids separator 12 for further treatment. In the embodiment shown in FIGS. 1 and 3, a portion of the retentate is recirculated back to the gasification process and mixed with the hydrocarbonaceous slurry being directed into the gasifier. Permeate from the ceramic membrane 22 generally has a turbidity below 5 NTU, which corresponds to a concentration of total suspended solids of less than 5 mg/l. In other embodiments, permeate exiting the ceramic membrane 22 has a concentration of total suspended solids of less than 50 mg/l.

Ceramic membranes are preferred over conventional polymeric membranes for the treatment of grey water since ceramic membranes are able to withstand more corrosive solutions and tolerate higher temperatures than conventional polymeric membranes. Grey water is generally extremely hot, having temperatures between 110-140° F. In addition, grey water can be extremely corrosive, having a pH range of approximately 5.5-8. Typically, ceramic membranes withstand contact with solutions having a pH of between 1-14 and temperatures greater than 200° F. Accordingly, the use of a ceramic membrane to treat grey water eliminates the need for heat exchangers to cool the grey water and reduces the need for chemical treatment to reduce corrosivity of the grey water. Further, because the ceramic membrane removes a significant portion of the suspended solids from the grey water, the use of a ceramic membrane generally reduces the amount of coagulate and flocculant needed in the solids separator 12. Thus, the implementation and use of the ceramic membrane 22 has the potential to lower overall chemical costs for treating the grey water.

Over time, suspended solids accumulate on the surface of the ceramic membrane 22 which causes a gradually reduced permeability though the ceramic membrane 22. To remove the accumulated solids from the ceramic membrane 22, in one embodiment, the flow of grey water being directed to the ceramic membrane 22 is diverted to a holding tank or accumulated in a balance tank, while the ceramic membrane 22 is back pulsed with water or permeate to dislodge the solids from its surface.

While some descriptions of ceramic membranes are discussed below, details of the ceramic membrane are not dealt with herein. For a review of general ceramic membrane technology, one is referred to the disclosures found in U.S. Pat. Nos. 6,165,553 and 5,611,931, the contents of which are expressly incorporated herein by reference. These ceramic membranes, useful in the processes disclosed herein, can be of various types.

The structure and materials of the ceramic membranes as well as the flow characteristics of ceramic membranes varies. Ceramic membranes normally have an asymmetrical structure composed of at least two, or more commonly three, different porosity levels. Generally, the ceramic membrane has a macroporous support, an active microporous top layer, and an intermediate layer with a pore size between that of the support and the microporous layer. The macroporous support ensures the mechanical resistance of the filter. Ceramic membranes are often formed into asymmetric, multi-channel elements. These elements are grouped together in housings, or membrane modules. These membrane modules can withstand high temperatures, extreme acidity or alkalinity and high operating pressures, making them suitable for many applications where polymeric and other inorganic membranes cannot be used. Several membrane pore sizes are available to suit specific filtration needs covering the microfiltration, the ultrafiltration, and nanofiltration ranges from 1 micron down to 250 Dalton MWCO.

Ceramic membranes can be made from many different types of materials (from alpha alumina to zircon). The most common membranes are made of Al, Si, Ti or Zr oxides, with Ti and Zr oxides being more stable than Al or Si oxides. In some less frequent cases, Sn or Hf are used as base elements. Other membranes can be composed of mixed oxides of two of the previous elements, and may include some additional compounds present in minor concentrations. Each oxide has a different surface charge in solution and thus, different oxides can be used to treat different solutions depending on the contaminants therein. Low fouling polymeric coatings for ceramic membranes are also available.

Ceramic membranes are typically operated in the cross flow filtration mode. This filtration mode has the benefit of maintaining a high filtration rate for membrane filters compared with the direct flow filtration mode of conventional filters. Cross flow filtration is a continuous process in which the feed stream flows parallel (tangential) to the membrane filtration surface and generates two outgoing streams.

Referring back to FIG. 1, the permeate exits the ceramic membrane 22 through outlet 26 and is directed to an evaporator 28, which produces a vapor, a distillate, and a concentrate. Although various types of evaporators can be utilized, in the embodiment shown in FIG. 1, the evaporator 28 is a falling film evaporator. Typically, the distillate recovered from the evaporator 28 contains dissolved solids as low as 5 ppm and less than 50 ppm and virtually no suspended solids. Distillate characterized by such low dissolved and suspended solids can be used for steam generation or deep well disposal. Alternatively, the distillate, like the retentate from ceramic membrane 22, may be recirculated back to the gasification process and mixed with the hydrocarbonaceous slurry being directed into the gasifier. In yet another example, the distillate can be used as feed make-up water for the syngas scrubber in the gasification process. Although FIGS. 1 and 3 illustrate the permeate from the ceramic membrane 22 being treated in a downstream evaporator 28, in other embodiments the permeate from the ceramic membrane may be directed into a deep well for disposal without prior treatment in an evaporator. Furthermore, the permeate from the ceramic membrane 22 can be directed to other types of downstream treatment, other than treatment in an evaporator.

In one embodiment, the concentrate from the falling film evaporator 28 exits the evaporator 28 through outlet 30 and is directed to a dewatering system 32 which removes the remaining water and produces a solid waste cake. Dewatering system 32 may include a crystallizer, prill tower, or a thermal dryer. In an alternate embodiment, the concentrate from the falling film evaporator 28 is directed to a forced circulation evaporator 34. The forced circulation evaporator 34 receives the concentrate and produces vapor and another distillate stream. The concentrate from the forced circulation evaporator 34 exits the evaporator 34 through outlet 36 and is directed to the dewatering system 32. As discussed above with reference to the distillate from the falling film evaporator 28, the distillate recovered from the forced circulation evaporator 34 can be used for steam generation or deep well disposal. It could also be mixed with the hydrocarbonaceous slurry in the gasification process or used as make-up water for the syngas scrubber in the gasification process.

Figure 2:
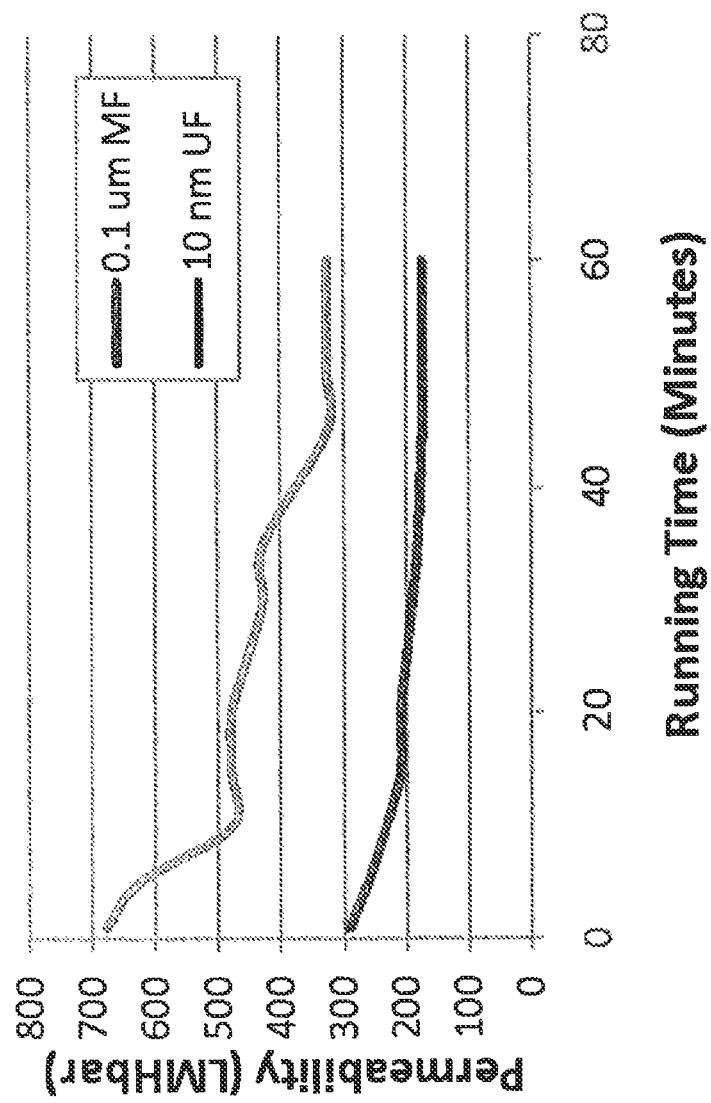
FIG. 2 is a graph providing permeability data collected from a solids separator overflow during experimental testing.

In experimental testing, 10 nm and 0.1 µm ceramic membranes were used to filter grey water. The membranes operated at a constant flux of 270 lmh and at operating pressures of less than 30 psig. The initial transmembrane pressure was 6 psi for the microfiltration ceramic membrane and 12 psi for the ultrafiltration ceramic membrane. Samples of grey water run through the membranes had a concentration of total suspended solids of approximately 3,640 ppm. The permeate from the microfiltration ceramic membrane had turbidity levels of approximately 0.22 NTU, while the permeate from the ultratfiltration ceramic membrane had turbidity levels of approximately 0.15 NTU. Permeability data collected from the solids separator overflow during the experimental testing are shown in FIG. 2. Membrane permeability is reported in lmh/bar (liters of permeate, per square meter of membrane area, per hour of production per bar of transmembrane pressure). During this experiment, grey water having a concentration of approximately 768 ppm was run in topped off batch mode for the first 45 minutes. At this point the feed was further concentrated to approximately 3,640 ppm. The measured transmembrane pressure increased initially, which is typical as the membrane becomes conditioned to the feed and experiences initial fouling and concentration polarization at the membrane surface. As shown in FIG. 2, the permeability fell off slightly as the concentration was building on the surface of the ceramic membrane. However, the concentration of the feed did not have a significant impact on the permeability through the ceramic membrane.

FIG. 3 is a schematic illustration of a gasification process that incorporates the system for treating a gasifier waste stream shown in FIG. 1. The gasification system shown in FIG. 3 is indicated generally by the numeral 50. As shown therein, a feedstock such as a hydrocarbonaceous feedstock is directed into a gasifier 52. Examples of hydrocarbonaceous feedstocks are coal and petroleum coke. Typically, coal or petroleum coke is pulverized and mixed with water to form a slurry and the slurry is directed into the gasifier 52. It should be appreciated that other fuels can be utilized as a feedstock in gasification processes. For example, organic waste material including plastic waste or sewage can form a feedstock. Typical gasifiers operate at high temperatures and high pressures. For example, a typical temperature range for a gasifier is approximately 1,200° C. to approximately 1,500° C. A typical pressure range is from approximately 20 to approximately 80 atmospheres.

Gasifier 52 includes a reaction zone 52A and a quenching chamber 52B. The feedstock or slurry is fed into the reaction zone 52A. In the case of coal for example, the coal slurry is fed into the reaction zone 52A and is partially oxidized. This produces a hot effluent syngas and slag. Syngas basically comprises carbon monoxide and hydrogen. Quenching water is directed into the quenching chamber 52B. The raw syngas and slag byproduct pass to the quenching chamber 52B typically disposed at the lower end of the gasifier 52. Here, the hot syngas and molten slag are contacted with quenching water and are cooled and separated. The slag, entrained within the some of the quenching water, is removed from the gasifier 52. The syngas is directed to a syngas scrubber 56 which removes fine ash, soot, salts, and other suspended solids from the syngas. In particular, as illustrated in FIG. 3, scrubbing water is introduced into the scrubbing chamber 56. As a result of the scrubbing water contacting the syngas, the scrubbing water removes fine ash, soot, salts, and other suspended solids from the syngas and this results in an aqueous waste stream (blowdown) that is directed from the syngas scrubber 56 to a settler feed tank 58. After the syngas has been scrubbed in the scrubber 56, the syngas is subjected to various other treatments. For example, water in the syngas is condensed and/or removed by a water knockout. Details of the further treatment of the syngas is not dealt with herein because such is not per se material to the present invention and further processes for treating the syngas after scrubbing are well known and appreciated by those skilled in the art.

Returning to the gasifier 52, as noted above, the slag byproduct combined with some of the quenching water is directed to a lockhopper 60. Lockhopper 60 removes slag from the quenching water-slag mixture and the removed slag, along with some water, is directed to a screening system 62. Screening system 62 separates the slag into coarse slag and fine slag. The coarse slag is suitable for commercial use or can be disposed in a landfill. The fine slag is directed to the settler feed tank 58 where it mixes with the scrubbing water down from the syngas scrubber 56. In some cases, the aqueous solution received and held in the settler feed tank 58 is referred to as black water. In any event, the aqueous solution in the settler feed tank 58 will include suspended solids such as slag, fly ash, etc.

The black water in the settler tank 58 is fed to the solids separator 12 which, as discussed above, removes substantial suspended solids including slag, fly ash, and other particulate matter. Solids separator 12 produces a supernatant or grey water waste stream that is directed from the solids separator 12 to a holding tank 64. A portion of the grey water held in the grey water holding tank 64 is treated by the treatment system 10 shown in FIG. 1.

One of the principle reasons for treating the grey water is that the grey water includes chloride salts that are of a concern since they are water soluble and tend to accumulate in recirculated process water. Furthermore, chloride is corrosive to material such as stainless steels, which are typically used in gasification process equipment. In partial oxidation gasification processes where coal, petroleum coke, or waste plastics and other chloro-organic materials are found in the feedstock, one of the most common chlorides exiting the gasifier is hydrogen chloride. In addition, partial oxidation reactions also produce ammonia from the feedstock. Ammonia and hydrogen chloride react in water systems to form an ammonium chloride solution. Thus, various chloride species might reside in the grey water and it is preferable to remove these corrosive species.

A large stream of grey water is pumped from the grey water holding tank 64 by pump 66 to a recycle line 68. Recycle line 68 leads back to the syngas scrubber 56 where the grey water is utilized to scrub the syngas. A smaller portion of the grey water is not recycled but is directed through the gasifier waste treatment system 10 shown in FIG. 1. As illustrated in FIG. 3, a treatment line 70 extends from recycle line 68 and directs a portion of the grey water into ceramic membrane 22. Ceramic membrane 22 functions to remove substantially all of the suspended solids from the grey water.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method for treating a gasifier waste stream containing suspended solids comprising:
   directing the gasifier waste stream from a gasification process to a solids separator;
   settling a portion of the suspended solids from the gasifier waste stream in the solids separator to produce a sludge and a grey water effluent containing remaining suspended solids;
   directing the grey water effluent from the solids separator to a ceramic membrane;
   removing at least a portion of the remaining suspended solids from the grey water effluent in the ceramic membrane to produce a retentate containing the removed suspended solids and a permeate;

directing the permeate from the ceramic membrane to an evaporator disposed downstream from the ceramic membrane to further concentrate the permeate and produce a vapor and concentrate;

condensing the vapor to form a distillate; and wherein removing at least a portion of the remaining suspended solids from the grey water reduces fouling in the evaporator.

2. The method of claim 1 further comprising recirculating the retentate from the ceramic membrane to the gasification process.

3. The method of claim 1 wherein the permeate from the ceramic membrane has a turbidity of less than 1 NTU.

4. The method of claim 1 wherein the evaporator is a falling film evaporator.

5. The method of claim 4 wherein the concentrate from the falling film evaporator is directed to a forced circulation evaporator for further treatment.

6. The method of claim 1 further comprising dewatering the concentrate from the evaporator.

7. The method of claim 5 further comprising dewatering the concentrate from the forced circulation evaporator.

8. The method of claim 1 wherein the sludge from the solids separator contains slag and fly ash.

9. A hydrocarbonaceous gasification process comprising:

directing a hydrocarbonaceous feedstock and water to a gasifier and producing slag and synthesis gas in the gasifier;

removing slag from the gasifier;

removing the synthesis gas from the gasifier and scrubbing the synthesis gas with scrubbing water, and separating the scrubbing water from the synthesis gas;

wherein a waste stream is formed and includes the scrubbing water and suspended solids including the slag removed from the gasifier;

directing the waste stream to a solids separator and separating at least some of the suspended solids from the waste stream and yielding a grey water effluent which includes some remaining suspended solids including slag;

removing at least some of the remaining suspended solids including slag from the grey water effluent to reduce fouling of a downstream evaporator;

the step of removing at least some suspended solids form the grey water effluent to reduce fouling including directing the grey water effluent through a ceramic membrane and removing at least some of the remaining suspended solids including the slag from the grey water effluent to produce a retentate containing suspended solids and a permeate;

directing the permeate from the ceramic membrane to the evaporator disposed downstream from the ceramic membrane to further concentrate the permeate and produce a vapor and a concentrate; and condensing the vapor produced by the evaporator to form a distillate.

10. The method of claim 9 including recirculating at least a portion of the retentate from the ceramic membrane to the gasifier.

11. The method of claim 10 including recirculating at least a portion of the distillate to the gasifier.

12. The method of claim 9 including directing coal or petroleum coke into the gasifier and partially oxidizing the coal or petroleum coke in the gasifier.

13. The method of claim 9 including removing at least 95% of the suspended solids in the grey water effluent with the ceramic membrane.

14. The method of claim 9 wherein the ceramic membrane includes a multi-channel monolith wherein the respective channels are coated with a microfiltration or ultrafiltration membrane.

15. The method of claim 9 wherein the temperature of the grey water effluent directed into and through the ceramic membrane is approximately 120° F. or higher.

16. The method of claim 15 wherein there is no heat exchanger or heat exchangers disposed between the solids separator and the ceramic membrane.

17. The method of claim 9 including directing the concentrate from the evaporator to a downstream forced circulation evaporator.

18. The method of claim 9 wherein the ceramic membrane concentrates the suspended solids in the grey water effluent by a factor of approximately 10 to approximately 30.

19. The method of claim 9 wherein the solids separator, ceramic membrane, and evaporator are disposed in the sidestream, and wherein the waste stream produced by the gasifier process is split into at least two streams, and wherein one stream is directed through the sidestream that includes the solids separator, ceramic membrane, and evaporator.

20. The method of claim 9 including removing sufficient suspended solids from the grey water effluent in the ceramic membrane such that the turbibity of the permeate is below 1 NTU.

21. A hydrocarbonaceous gasification process comprising:

directing a hydrocarbonaceous feedstock and water to a gasifier and producing slag and synthesis gas in the gasifier;

removing slag from the gasifier;

removing the synthesis gas from the gasifier and scrubbing the synthesis gas with scrubbing water, and separating the scrubbing water from the synthesis gas;

wherein a waste stream is formed and includes the scrubbing water and suspended solids including the slag removed from the gasifier;

directing the waste stream to a solids separator and separating at least some of the suspended solids from the waste stream and yielding a grey water effluent which includes some remaining suspended solids including slag and fly ash;

directing the grey water effluent to a ceramic membrane; and utilizing the ceramic membrane to remove substantially all remaining suspended solids in the grey water effluent and wherein the ceramic membrane produces a retentate including substantially all remaining suspended solids including slag and fly ash and a permeate.

22. The method of claim 21 including recirculating at least a portion of the retentate from the ceramic membrane to the gasifier.

23. The method of claim 22 including directing coal or petroleum coke into the gasifier and partially oxidizing the coal or petroleum coke in the gasifier.

24. The method of claim 21 including removing at least 95% of the suspended solids in the grey water effluent with the ceramic membrane.

25. The method of claim 24 wherein the ceramic membrane includes a multi-channel monolith wherein the respective channels are coated with a microfiltration or ultrafiltration membrane.

26. The method of claim 21 wherein the temperature of the grey water effluent directed into and through the ceramic membrane is approximately 120° F. or higher.

27. The method of claim 26 wherein there is no cooling of the grey water effluent between the solids separator and the ceramic membrane.

28. The method of claim 21 wherein the ceramic membrane is disposed in a sidestream and wherein the grey water effluent is split into at least two streams, one stream being directed through the sidestream and the other stream used in a process associated with the gasification process.

* * * * *